United States Patent
Kent et al.

(10) Patent No.: US 7,456,825 B2
(45) Date of Patent: **\*Nov. 25, 2008**

(54) ACOUSTIC TOUCH SENSOR WITH LOW-PROFILE DIFFRACTIVE GRATING TRANSDUCER ASSEMBLY

(75) Inventors: Joel C. Kent, Fremont, CA (US); Robert Adler, Northbrook, IL (US); Charles Dudley Copper, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/544,188

(22) Filed: Oct. 6, 2006

(65) Prior Publication Data

US 2007/0024599 A1  Feb. 1, 2007

Related U.S. Application Data (63) Continuation of application No. 10/603,514, filed on Jun. 24, 2003, now Pat. No. 7,119,800.

(51) Int. Cl.
*G06F 3/043* (2006.01)
(52) U.S. Cl. ............... 345/177; 178/18.01; 310/313 D; 310/334
(58) Field of Classification Search .............. 178/18.01, 178/18.03–18.04, 19.02; 310/313 A–313 D, 310/313 R, 334; 345/173, 177
See application file for complete search history.

(56) References Cited

U.S. PATENT DOCUMENTS

| | | | |
|---|---|---|---|
| 3,673,327 A | 6/1972 | Johnson et al. | |
| 4,644,100 A | 2/1987 | Brenner et al. | |
| 4,677,336 A | 6/1987 | Kushida et al. | |
| 4,746,914 A | 5/1988 | Adler | |
| 5,177,327 A | 1/1993 | Knowles | |
| 6,091,406 A | 7/2000 | Kambara et al. | |
| 6,225,985 B1 | 5/2001 | Armstrong et al. | |
| 6,392,167 B1 | 5/2002 | Nakagawa | |
| 2002/0104691 A1 | 8/2002 | Kent et al. | |

FOREIGN PATENT DOCUMENTS

WO   WO 98/29853 A1   7/1998

OTHER PUBLICATIONS

International Search Report for International Application No. PCT/US2004/016908, mailed Feb. 9, 2005.

*Primary Examiner*—Richard Hjerpe
*Assistant Examiner*—Michael Pervan

(57) ABSTRACT

A touch sensor having an acoustic substrate, an acoustic transducer, and an acoustically diffractive grating is provided. The grating is disposed between the transducer and the substrate, so that acoustic energy from the transducer is coupled to an acoustic wave propagating along the surface of the substrate. If used in a display device, the combination of the transducer and grating may provide a low profile that allows the assembly to be more easily placed between the acoustic substrate and a bezel placed in front of the substrate. No acoustic components need be mounted on the rear surface of the substrate, allowing the acoustic substrate to be formed on the front surface of the display device.

22 Claims, 5 Drawing Sheets

ACOUSTIC TOUCH SENSOR WITH LOW-PROFILE DIFFRACTIVE GRATING TRANSDUCER ASSEMBLY

CROSS-REFERENCE TO RELATED APPLICATIONS

This application is a continuation of copending, commonly assigned U.S. application Ser. No. 10/603,514, filed Jun. 24, 2003, the disclosure of which is incorporated herein by reference.

FIELD OF THE INVENTION

The field of the present invention relates to touch sensor technology, and more particularly to acoustic touch sensor technology.

BACKGROUND OF THE INVENTION

Touch sensors are transparent or opaque input devices for computers and other electronic systems. As the name suggests, touch sensors are activated by touch, either from a user's finger, or a stylus or some other device. A transparent touch sensor, and specifically a touchscreen, is used in conjunction with a display device, such as cathode ray tube (CRT), liquid crystal display (LCD), plasma, electroluminescent, or other type of display, to form a touch display. These touch displays are increasingly used in commercial applications, such as restaurant order entry systems, industrial process control applications, interactive museum exhibits, public information kiosks, pagers, cellular phones, personal digital assistants, and video games.

The dominant touch technologies presently in use are resistive, capacitive, infrared, and acoustic technologies. Touchscreens incorporating these technologies have delivered high standards of performance at competitive prices. All are transparent devices that respond to a touch by transmitting the touch position coordinates to a host computer. Acoustic touchscreens, also known as ultrasonic touchscreens, have competed effectively with these other touch technologies. This is due in large part to the ability of acoustic touchscreens to handle demanding applications with high transparency and high resolution touch performance, while providing a durable touch surface.

Typically, an acoustic touchscreen comprises a touch sensitive substrate in which an acoustic wave is propagated. When a touch occurs on the substrate surface, it results in the absorption of at least a portion of the wave energy being propagated across the substrate. The touch position is determined using electronic circuitry to locate the absorption position in an XY coordinate system that is conceptually and invisibly superimposed onto the touchscreen. In essence, this is accomplished by recording the time the wave is initially propagated and the time at which a touch induced attenuation in the amplitude of the wave occurs. The difference in these times can then be used, together with the known speed of the wave through the substrate, to determine the precise location of the touch.

A transparent touch sensor, and specifically a touchscreen, is generally placed over a display device, such as cathode ray tube (CRT), liquid crystal display (LCD), plasma, electroluminescent, or other type of display. Alternatively, the touchscreen can be constructed directly on the front surface of the display device, so that the surface of the display device is touch sensitive. This latter construction is desirable because it eliminates a piece of glass or other material between the viewer and the display device, increasing the perceived display brightness and contrast ratio. Also, there are economic advantages in dispensing with an overlay glass and not having to modify the chassis of the display device to make room for the overlay glass.

The acoustic touchscreen comprises an acoustic substrate and transducers, which are elements that convert energy from one form to another. For example, a transmit transducer may receive a tone burst from associated electronic circuitry and then emit an acoustic wave across the substrate. A receive transducer may receive a transmitted acoustic wave from the substrate and generate an electronic signal that is transmitted to associated electronic circuitry for processing.

Various types of acoustic transducer assemblies are known. The most common types used in acoustic touchscreens are wedge transducer assemblies, grating transducer assemblies, and edge transducers.

Figure 1A:
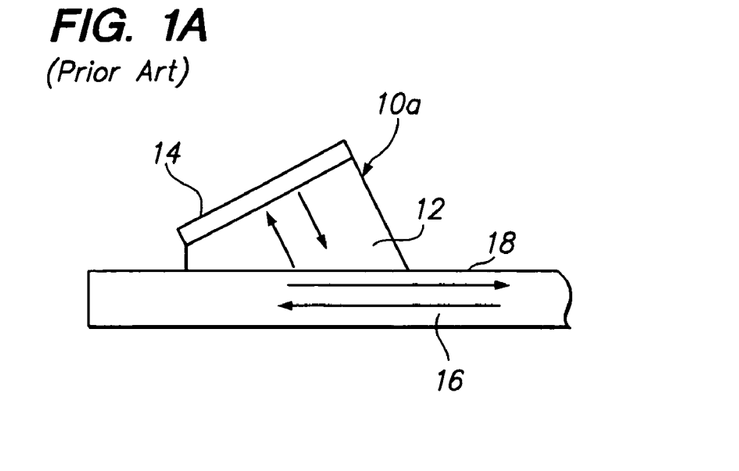
FIG. 1(a) is a side view of a prior art wedge transducer assembly.

FIG. 1(a) illustrates a typical wedge transducer assembly 10a, which utilizes the phenomenon that acoustic waves are refracted when they are obliquely incident on a boundary surface of different media with appropriately differing wave velocities. Based on this principle, the wedge transducer assembly 10a consists of a plastic wedge 12 with its hypotenuse adhered to the front surface 18 of the acoustic substrate 16, which is composed of a different material than that of the wedge 12, e.g., glass. The wedge transducer assembly 10a also comprises a transducer, and specifically a piezoelectric element 14, mounted to a side of the wedge 12 other than the hypotenuse. As illustrated by the arrows, the piezoelectric element 14 couples to a bulk wave in the wedge 12, which propagates at the critical angle, i.e., the "wedge angle," to refract to or from a horizontally propagating wave in the substrate 16.

Figure 1B:
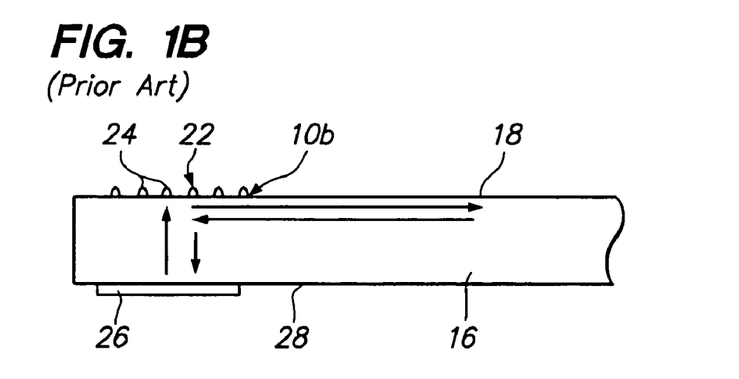
FIG. 1(b) is a side view of a prior art grating transducer assembly.

FIG. 1(b) illustrates a typical grating transducer assembly 10b, which comprises a grating 22 composed of perturbation elements 24, which are aligned in parallel strips along front substrate surface 18. The grating transducer assembly 10b also comprises a transducer, and specifically a piezoelectric element 26, mounted on a rear surface 28 of the substrate 16 opposite the front substrate surface 18. As illustrated by the arrows, the piezoelectric element 26 couples to a bulk wave in the substrate 16. This bulk wave couples, via the grating 22, to two oppositely traveling horizontally propagating waves in the substrate 18. Further details regarding the structure and use of grating transducers are disclosed in U.S. Pat. No. 6,091,406, which is expressly incorporated herein by reference.

Figure 1C:
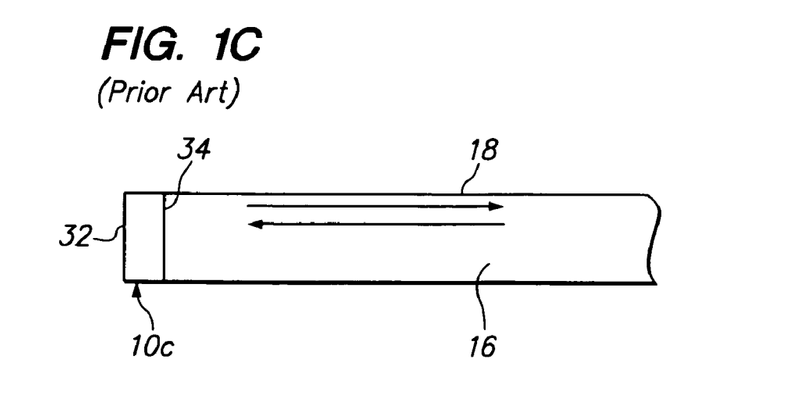
FIG. 1(c) is a side view of a prior art edge transducer.

FIG. 1(c) illustrates a typical edge transducer 10c, which comprises a piezoelectric element 32 mounted directly on an edge 34 of the substrate 16 in such a manner that an acoustic wave with appreciable power at the front substrate surface 18 is generated. The interface thus serves the mechanical function of connecting the piezoelectric element 32 to the substrate 16, as well as the acoustic function of coupling to a horizontally propagating wave in the substrate 16, as illustrated by the arrows. Further details regarding the structure and use of edge transducers to excite horizontally polarized shear waves are disclosed in U.S. Pat. No. 5,177,327, which is expressly incorporated herein by reference.

Ultimately, the selection of which transducer type to use will depend, at least in part, on the structural environment in which the touchscreen is to be mounted. For example, selection of the transducer type may depend on whether the acoustic substrate is either overlaid on the front panel of a display device to form a separate faceplate, or incorporated directly into the front panel of the display device. Selection of the transducer type may also depend on the shape of the acoustic substrate, e.g., whether it is curved or flat.

Figure 2:
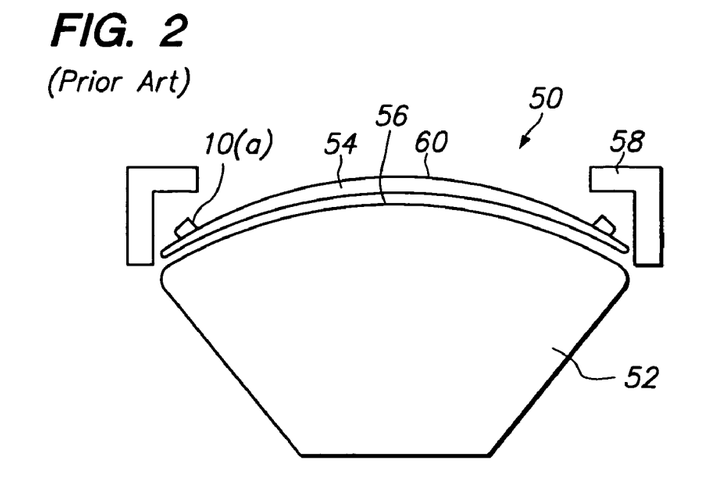
FIG. 2 is a cross-sectional view of a prior art touch display having a display device with a curved front panel.

For example, FIG. 2 illustrates a touch display 50 that comprises a display device 52 and an acoustic substrate 54 that is overlaid onto the display device 52. The display device 52 has a curved front panel 56, such as in a typical cathode ray tube, and the acoustic substrate 54 has a corresponding curved shape. Due to the curved geometry of the acoustic substrate 54, a space exists between the substrate 54 and a bezel 58 covering the periphery of the substrate 54. In this case, a wedge transducer assembly 10a, even with its relatively high profile, can be conveniently mounted on the front surface 60 of the substrate 54 within this space. Thus, wedge transducer assemblies 10a may be used where it is possible or desirable to mount a transducer on the front surface 60 of the acoustic substrate 54.

Figure 3:
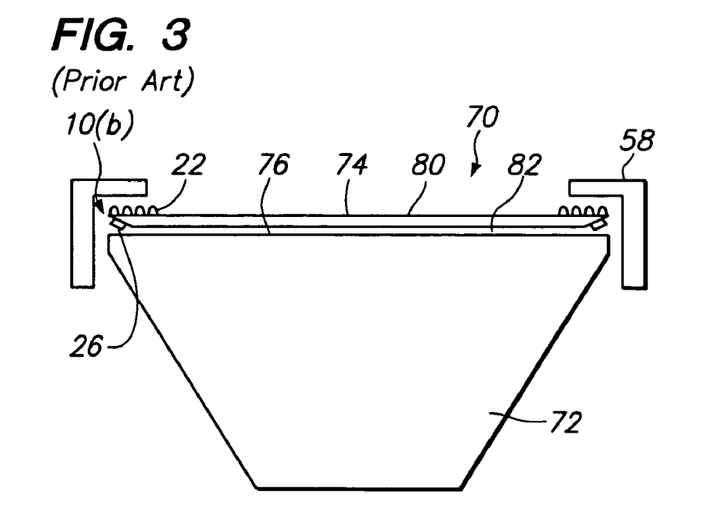
FIG. 3 is a cross-sectional view of a prior art touch display having a display device with a flat front panel.

FIG. 3 illustrates a touch display 70 that also comprises a display device 72 and an acoustic substrate 74 that is overlaid onto the display device 72. The display device 72, however, has a flat front panel 76, such as a liquid crystal display, a flat CRT or a plasma display, and the acoustic substrate 74 is also flat. As a result, there is no or very little clearance between the substrate 74 and the bezel 58. In this case, a grating transducer assembly 10b can be used despite the minimal clearance provided. The gratings 22 of the transducer assembly 10b, which have a relatively low profile, can be located on the front surface 80 of the substrate 74 within the minimal space provided between the bezel 58 and the substrate 74. The piezoelectric element 26 can be located on the rear surface 82 of the substrate 74. The rear substrate surface 82 may be beveled or inclined in order to provide clearance between the piezoelectric element 26 and the front panel 76 of the display device 72.

In touch displays where there is peripheral space available between the bezel 58 and the edges of the acoustic substrate, an edge transducer 10c can be mounted to the substrate in this space. However, the requirement of a carefully machined vertical surface may add significant cost to this approach. Furthermore, if coupling to Rayleigh waves is desired, edge transducers become more complex and thus less desirable.

Although a touchscreen manufacturer can typically find a viable solution when selectively incorporating the above-described transducers 10 within an acoustic substrate that forms a separate faceplate, such may not be the case when the acoustic substrate forms the front panel of the display device, i.e., the display device, itself, has a touch sensitive front panel. For example, the piezoelectric element of a grating transducer assembly must be placed on the rear surface of the acoustic substrate—an option not available when the substrate forms the front panel of the display device. In the case where the display device has touch sensitive front panel that is flat, e.g., a CRT or 50" plasma-display, mounting of a wedge transducer assembly on the front surface of the display may be difficult, often resulting in mechanical interference between the bezel and the transducer. This interference may impede the proper functioning of the transducer, or worse yet, damage either the transducer or the bezel. Much more so than the case where the acoustic substrate forms a separate faceplate, it may be very difficult to provide a vertical machined surface for an edge transducer.

Often, a touchscreen manufacturer does not have the option to modify the housing in which the display device is enclosed. In building a touchscreen that forms the faceplate of a display device, the touchscreen manufacturer normally does not manufacture the display device itself. Rather, the manufacturer works with the display device, as supplied by a monitor manufacturer. Since it is often impractical for the touchscreen manufacturer to replace the supplied housing with a new housing, the manufacturer must adapt to whatever space is available between the supplied housing and the display device for accommodating the touchscreen elements. Even where the touchscreen manufacturer has design control over the bezel, mechanical interference with the transducers often forces a reduction in the dimensions of the bezel opening that prevents one from utilizing the full available display area of the display device.

There thus remains a need to provide a relatively low-profile transducer that can be mounted on the front surface of an acoustic substrate.

SUMMARY OF THE INVENTION

In accordance with a first aspect of the present invention, a touch sensor is provided. The touch sensor comprises an acoustic substrate having a surface. In one preferred embodiment, the substrate is transparent, so that it can be used in conjunction with a display device. The touch sensor further comprises an acoustic transducer, which in one preferred embodiment, comprises a piezoelectric element. The touch sensor further comprises an acoustically diffractive grating disposed between the substrate and the transducer. The diffractive grating is configured to couple acoustic energy within the transducer to an acoustic wave propagating along the surface of the substrate. The grating can be disposed between the substrate and the transducer in any one of a variety of manners. For example, the grating can be a structurally distinct element that is suitably adhered between the substrate and transducer. Or the grating can be structurally integrated with either or both of the transducer and substrate, e.g., formed on or into either or both of the surfaces of the transducer and substrate. Thus, it can be appreciated that, for the purposes of this specification, a grating is between the substrate and transducer if an acoustic wave traveling along the surface of the substrate impinges on the grating before traveling through the transducer, or if an acoustic wave traveling from the transducer impinges on the grating before traveling across the surface of the substrate. Although the present invention should not be so limited in its broadest aspects, the combination of the transducer and grating has a relatively low profile that allows the combination to more easily fit between the acoustic substrate and another structure, e.g., a bezel, placed in front of the substrate.

In one preferred embodiment, the diffractive grating comprises an array of parallel elements. Preferably, the elements are spaced from each other a distance equal to the wavelength of the acoustic wave propagating on the substrate surface. In this manner, the diffracted acoustic energy will combine together to form a stronger acoustic wave. The touch sensor may also comprise a second acoustic transducer, and a second acoustically diffractive grating disposed between the substrate and the second transducer. In this case, the second diffractive grating can couple acoustic energy within the second acoustic transducer to the acoustic wave. Thus, the first transducer and grating can transmit an acoustic wave across the surface of the substrate, and the second transducer and grating can receive the acoustic wave from the substrate surface.

In accordance with a second aspect of the present invention, a touch display is provided. The touch display comprises a display device, e.g., a cathode ray tube (CRT), liquid crystal display (LCD), plasma, electroluminescent, or other type of display. The touch display further comprises an acoustic touchscreen whose substrate is the front surface the display device, an acoustic transducer, and an acoustically diffractive grating disposed between the substrate and the transducer. As previously described, the diffractive grating is configured to couple acoustic energy within the acoustic transducer to an acoustic wave propagating along the surface of the substrate. The diffractive grating, transducer, and substrate can include features similar to those previously described above. Notably, the low profile of the combined transducer and grating itself is well suited to display devices with flat integrated acoustic substrates that have very little space between the substrate and bezel.

BRIEF DESCRIPTION OF THE DRAWINGS

The drawings illustrate the design and utility of a preferred embodiment of the present invention, in which similar elements are referred to by common reference numerals. In order to better appreciate the advantages and objects of the present invention, reference should be made to the accompanying drawings that illustrate this preferred embodiment. However, the drawings depict only one embodiment of the invention, and should not be taken as limiting its scope. With this caveat, the invention will be described and explained with additional specificity and detail through the use of the accompanying drawings in which.

DETAILED DESCRIPTION OF THE PREFERRED EMBODIMENTS

Figure 4:
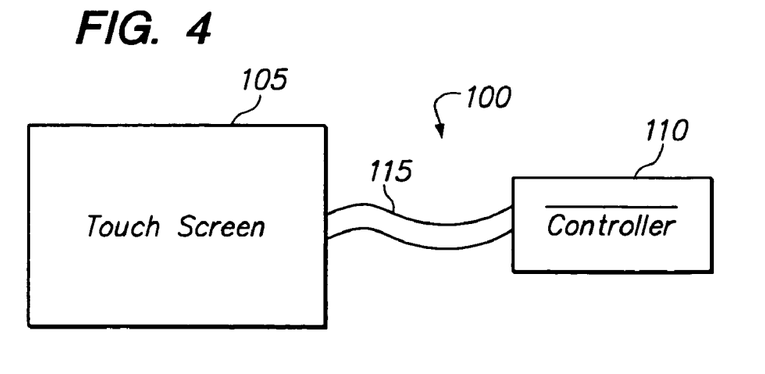
FIG. 4 is a block diagram of a touchscreen system constructed in accordance with one preferred embodiment of the present invention.

Referring now to FIG. 4, a touchscreen system 100 constructed in accordance with a preferred embodiment of the present invention is described. The touchscreen system 100 generally comprises an acoustic touchscreen 105 (i.e., a touch sensor having a transparent substrate), a controller 110, and a lead 115 coupling the controller 110 to the touchscreen 105. The touchscreen system 100 is configured to respond to a touch on the touchscreen 105 by causing acoustic signals to be transmitted across the touchscreen 105, one or more of which are modulated in the presence of the touch. The controller 110 in turn uses the modulated signal to identify the location on the touchscreen 105 where the touch occurred. If the controller 110 identifies a touch as valid, it transmits the position of the touch to a host computer (not shown) that then implements a corresponding computer function to display the pertinent information on a display device (shown in FIG. 5), for example, graphics such as an icon or a menu or directory from which the user can select options.

Figure 5:
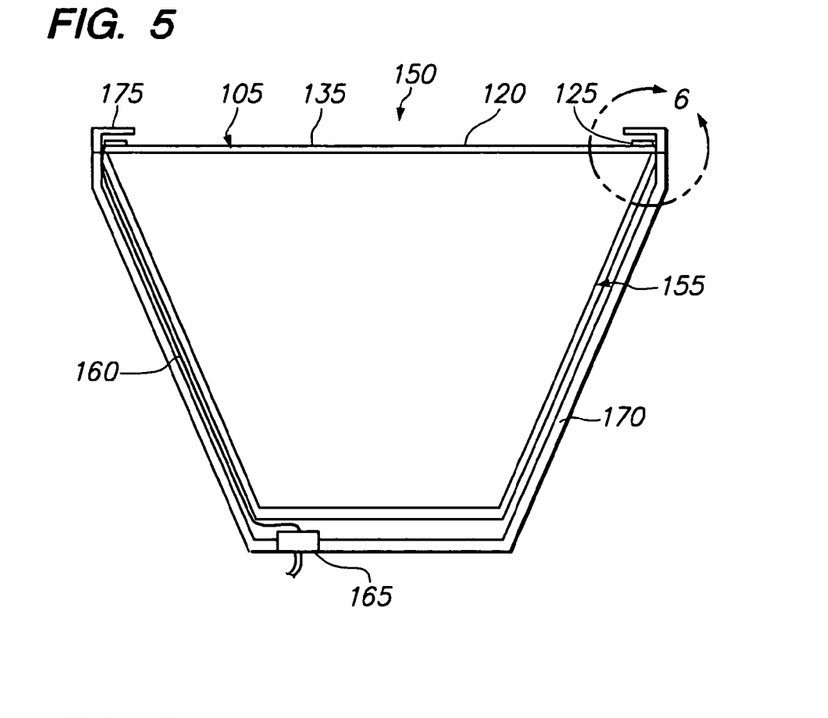
FIG. 5 is a top cross-sectional view of a touch display incorporating the touch screen system of FIG. 4.

As illustrated in FIG. 5, the touchscreen 105 comprises an acoustic substrate 120 having a front surface 135 and a plurality of transducer assemblies 125 mounted to the front substrate surface 135. Typically, four transducer assemblies 125 (only two shown in FIG. 5) are used, two of which are operated by the controller 110 to transmit the acoustic signals across the front substrate surface 135 in respective orthogonal directions, and the other two of which are operated by the controller 110 to receive the acoustic signals from the front substrate surface 135. These ultrasound signals form a grid that allows the controller 110 to determine the position of the touch on the substrate 120. Further details on the general use and construction of acoustic touchscreen systems to identify and locate touches are disclosed in U.S. Pat. Nos. 3,673,327, 4,644,100 and 6,091,406, which are expressly incorporated herein by reference.

As shown in FIG. 5, the touchscreen system 100 can be used in conjunction with a conventional display device 155 to create a touch display 150. In this embodiment, the faceplate of the display device 155 serves as the substrate 120 of the touchscreen 105. The touchscreen 105 is coupled via a cable 160 to an outlet 165, which is to receive power from, and interface, with the controller 110 (shown in FIG. 4). The touch display 150 comprises a generally hollow monitor back case 170, which receives the display device 155 and all of the associated circuitry and cables, and a bezel 175, which covers and protects the touchscreen 105 and associated componentry.

In the illustrated embodiment, the acoustic substrate 120 has a generally flat rectangular geometry. Although the present invention is most beneficial in the context of acoustic substrates that form the flat faceplate of a display device, the present invention is generally applicable to all types of display devices. For example, the touchscreen 105 can be disposed over a preexisting faceplate of a display device. The substrate 120 can have a non-rectangular shape, such as a hexagonal shape, and may alternatively be curved along one or both the X- and Y-axes.

The substrate 120 itself is composed of a material that allows propagation of an acoustic wave through the substrate 120 in a direction parallel to the front substrate surface 135 at the operating frequency. Although the substrate 120 may conveniently be composed of the same material that the front surface of conventional display devices are often composed of (e.g., glass), the substrate 120 can be composed of other materials. Additionally, the substrate 120 need not be homogenous, but can be composed of a non-homogenous material, e.g., formed of different layers.

The acoustic wave that propagates through the substrate 120 may be any type that is detectably perturbed by a touch on the front substrate surface 135. Many options exist for the choice of surface bound or plate wave modes. Surface bound waves, such as Rayleigh waves (which include quasi-Rayleigh waves), have excellent touch sensitivity and are inherently confined to a thin volume close to the surface even for a substrate of an arbitrarily large thickness. Horizontally polarized shear waves have the advantage that they weakly couple to liquid and gel-like contaminants, such as water and silicone-rubber seals. A non-homogenous substrate may, in addition to supporting propagation of other types of waves, be particularly adapted to support propagation of horizontally polarized shear waves having asymmetric surface power density, including Love waves, which are horizontally polarized shear waves trapped near the touch surface like Rayleigh waves. Lamb waves in a sufficiently thin substrate provide yet another option for the choice of acoustic wave mode. Various engineering trade-offs are involved in the optimal choice of acoustic mode for a given application.

Figure 6:
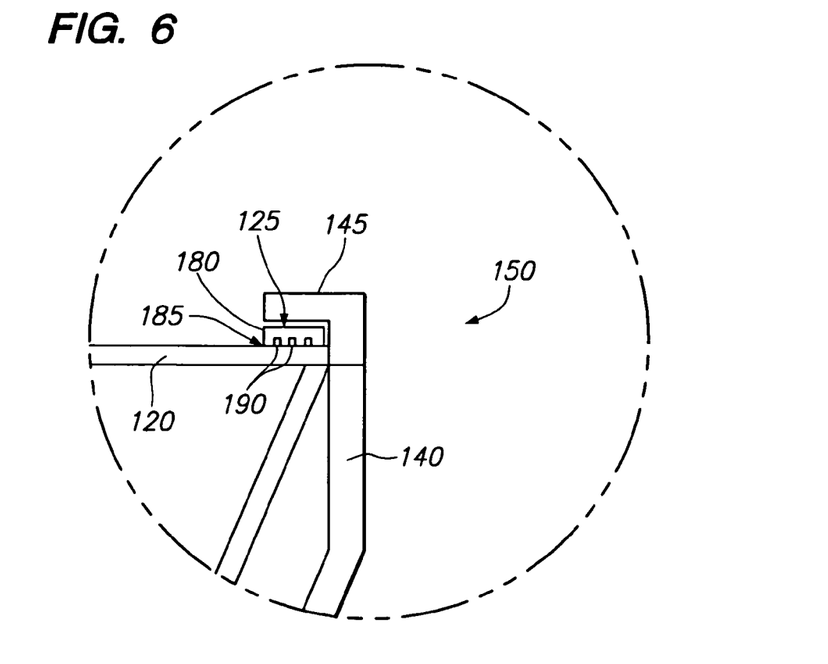
FIG. 6 is a close-up view of the touch display of FIG. 5 in the region indicated by line 6-6.

As best shown in FIG. 6, each of the transducer assemblies 125 comprises an acoustic transducer 180 and an acoustic diffraction grating 185 disposed between the substrate 120 and the transducer 180. Although the transducer 180 most commonly is composed of piezoelectric material, such as lead zirconium titanate, lead titanate, or lithium niobate, the present invention is not be so limited. Any transducer that converts acoustic energy into another form of energy, or vice versa (e.g., optoacoustic transducers, magnetoacoustic transducers, acousto-acoustic (converts energy between one acoustic mode and another), and thermoacoustic transducers, among others, are available.

The transducer 180 typically takes the form of a thin rectangular element having conductive portions serving as electrodes with a piezoelectric responsive material therebetween. However, there is no requirement that the transducer 180 be rectangular, for example if the touchscreen surface does not have square corners the shape of the transducer can accommodate the geometry of available layout space. When an oscillating voltage signal is applied to the electrodes of transducer 180, the resulting electric field within the piezoelectric material, via the piezoelectric effect, causes the transducer 180 to vibrate, depending on the nature of the piezoelectric material, arrangement of the electrodes, and mechanical limitations or couplings. Conversely, if the transducer 180 is subjected to mechanical oscillations, an oscillating voltage will appear on the electrodes.

There are several options regarding the mode of the mechanical oscillations produced by the transducer 180. A common choice is the lowest-order compression-expansion oscillation with respect to the thin dimension of the transducer 180. Such an element couples to other acoustic modes with a significant longitudinal component. Another option is a lowest-order shear oscillation in which one electrode-bearing surface moves parallel to the opposite face in the opposite direction. Such a transducer 180 couples to other acoustic modes with shear components. The direction of shear motion can be designed to be any direction within the plane of the electrodes. More complex options are also possible, including use of higher order oscillations, such as third, fifth, seventh, etc.

The transducer 180 is designed to have a resonant frequency at the operating frequency for the desired mode of oscillation, e.g., 5 MHz. For lowest order compression or pressure oscillation, the resonant frequency is the bulk pressure-wave velocity (in the piezoelectric material) divided by twice the thickness of the transducer 180, so that the thickness of the transducer 180 is half of the bulk pressure wavelength. Similarly, for lowest order shear oscillation, the resonant frequency is the bulk shear-wave velocity (in the piezoelectric material) divided by twice the thickness of the transducer 180, so that the thickness of the transducer 180 is half of the bulk shear wavelength. As used in a touchscreen 105, the transducer 180 is a damped mechanical oscillator due to coupling to acoustic waves in the substrate 120.

The grating 185 is configured to couple the acoustic energy generated by the transducer 180 to the acoustic wave propagating horizontally across the substrate 120 (i.e., the acoustic wave propagating parallel to the substrate surface 135). To this end, the grating 185 comprises an array of periodic acoustic perturbation elements 190 that are capable of coupling acoustic wave modes. Unlike the prior art grating transducer assembly 10b illustrated in FIG. 1(b), there is no intermediate bulk wave that travels through the substrate 120 between the transducer 180 and grating 185. Rather, the perturbation elements 190 are in direct contact with the surface of the transducer 180, so that the acoustic energy is directly coupled between the transducer 180 and perturbation elements 190. To maximize the coupling of acoustic energy between the transducer 180 and the perturbation elements 190, and thus the diffractive nature of the grating 185, the media between the perturbation elements 190 inefficiently couples to the transducer 180. Preferably, this media is composed of air, but can be composed of other materials, such as epoxy, as long as the relative acoustic coupling characteristics of the perturbation elements 190 are significantly greater than those of the intervening media.

Thus, it can be appreciated that acoustic energy generated by the transducer assembly 125 (when operated in the transmit mode) via electrical signals is incident on the grating 185 and is converted into surface bound or plates waves. The surface bound or plate waves propagate in the substrate 120 in the directions of the X-axis and the Y-axis through a plurality of paths previously described above. The surface bound or plate waves are then incident on the grating 185 and then converted into acoustic energy that is received by the transducer 125 (when operated in the receive mode), which is in turn converted into electrical signals.

In the illustrated embodiment, each perturbation element 190 may be straight. Alternatively, each perturbation element 190 may also be curved, and such elements may act as acoustic lenses. Each perturbation element 190 may also be a dot or a short elongated segment that interacts only with a portion of the acoustic wave. Optionally, perturbation elements may be provided to scatter to two or more different acoustic waves, each potentially having a different wave mode or axis of propagation.

The grating perturbation cycle, i.e., the interval or pitch of the grating 185 may be selected within a range of, for instance, about 0.01 to 10 mm, preferably about 0.1 to 5 mm, and more preferably about 0.3 to 1 mm, according to the wavelength of the acoustic wave horizontally propagating through the substrate 120. So that there is an additive effect between the diffracted acoustic waves, the pitch of the grating 185 is preferably equal to the wavelength of the horizontally propagating wave.

Notably, the grating 185 will typically couple to two horizontally propagating waves traveling in opposite directions. The wave traveling to or from the center of the substrate 120 will be used by the touchscreen system 100 to determine the location of touches on the substrate 120, while the wave traveling to or from the edge of the substrate 120 will be discarded. Optionally, an acoustic reflector (not shown) can be placed between the grating 185 and the edge of the substrate 120 in order to reflect the acoustic wave back towards the grating 185.

As a general rule, the perturbation elements 190 should be as inelastic (i.e., difficult to compress or tense) as possible to provide efficient coupling of the acoustic energy from the transducer 180 to the substrate 120. Since the compressibility of material is determined by the thickness of the element divided by the Young's modulus, the undesired compressibility of the element will be proportional to its thickness. As such, the smaller the Young's modulus of the material of which the perturbation elements 190 are composed, the thinner the perturbation elements 190 should be. Notably, even a relatively soft material, such as epoxy, can efficiently be used as a perturbation element 190 if it is thin enough. The perturbation elements 190 can either be composed of homogenous material or may be composed of several materials. In each case, the overall compressibility of the material should be considered in order to maximize acoustic coupling between the transducer 180 and substrate 120.

As will be described in further detail below, the grating 185 can be variously constructed between the transducer 180 and substrate 120 and each perturbation element 190 can take any one of a variety of cross-sectional shapes (e.g., semi-circular, triangular, rectangular, saw-tooth, etc.). The grating 185 can either be formed of a distinct assembly that is suitably adhered between the substrate 120 and transducer 180, or integrated with the substrate 120 or transducer 180, e.g., by forming it on or into the front substrate surface 135 or transducer 180. The grating 185 may be formed using any one of a variety of processes. For example, the grating 185 can be formed by depositing glass frit by screen printing. The grating 185 may also be formed by etching, cutting or grinding, or laser ablation, or by other removal means. The grating 185 may also be formed by molding, hot stamping, or by post-fabrication modification of the properties of the substrate 120 or transducer 180. The height and/or width of the individual perturbation elements may vary across the grating to balance reflectivity and transparency over the grating 185.

Significantly, the combination of the grating 185 and transducer 180 should have a relatively low profile, so that the combination can fit between the substrate 120 and the bezel 145, as illustrated in FIG. 5. Typically, this can be easily accomplished, since the thickness of the grating 185 can be made much less than an acoustic wavelength, and the thickness of the transducer 180 will be half of the length of the relevant bulk wave.

Figure 7:
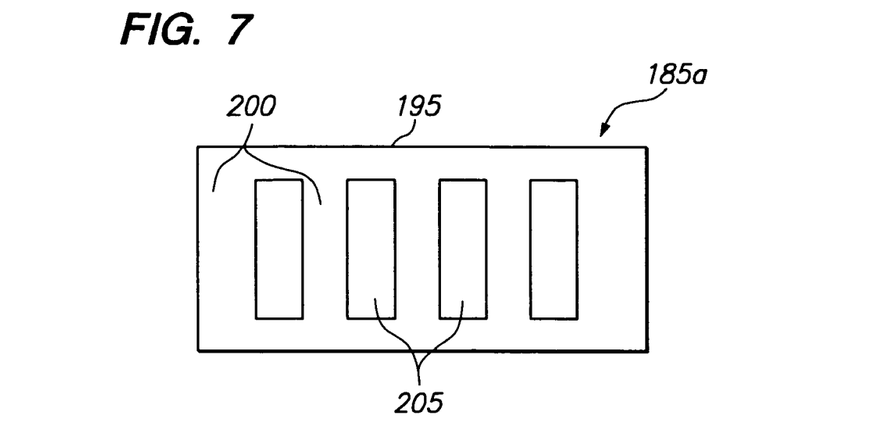
FIG. 7 is a top view of one preferred embodiment of a grating that can be used in the touchscreen illustrated in FIG. 5.

FIG. 7 illustrates a grating 185a that comprises a metal foil 195 through which a negative pattern of the perturbation elements 190 is etched to form alternating tines 200 (perturbation elements) and slots 205. For purposes of manufacturing efficiency, multiple sets of perturbation patterns can be etched into larger foil sheets, which can then be cut into smaller foils, each of which comprises a single perturbation pattern. The preferred thickness of the metal foil 195 is between 0.050 and 0.075 mm. Assuming a surface wave velocity of the horizontally propagating acoustic wave through the substrate 120 (composed of glass) of 3.16 mm/μs and a frequency of 5.53 MHz., the relevant acoustic wavelength will be 0.571 mm. Accordingly, each tine 200 should be 0.286 mm wide, and each slot 205 should also be 0.286 mm wide in order to provide the grating 185(a) with a 0.571 mm pitch (i.e., 0.571 mm between the centers of adjacent tines 200).

Figure 8:
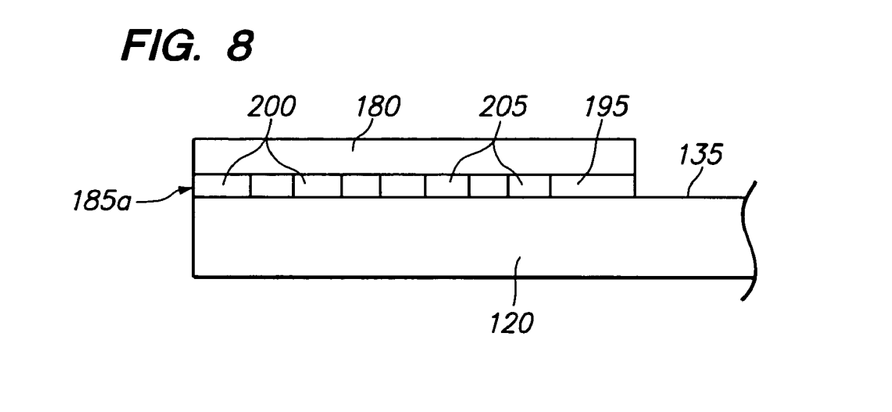
FIG. 8 is a side view of the grating of FIG. 7 used in the touchscreen illustrated in FIG. 5.

After the etching process is completed, the foil 195 can then be adhered to the underside of the transducer 180 using a suitable adhesive, such as epoxy, as illustrated in FIG. 8. The resulting subassembly (transducer 180 and foil 195) is then suitably adhered to the front surface 135 of the substrate 120. Preferably, the cured cement layers should be no more than 0.025 mm thick, so that the elasticity of the grating 185 is not unduly increased. In cementing the structure together, it may be impossible to avoid filling the slots 205 wholly or partially with cement. Fortunately, this is not of critical importance, since the transmission of acoustic energy through the relatively soft adhesive is much less efficient than the transmission through the metal foil 195.

Alternatively, the slots 205 can be dimensioned and completely filled with epoxy or some other material with a low acoustic velocity, so that the acoustic energy coupled between the transducer 180 and the substrate 120 through the slots 205 is 180 degrees out-of-phase with the acoustic energy coupled between the transducer 180 and the substrate 120 through the tines 200. In this manner, the excitation of the desired waves on the substrate surface from this "parasitic" acoustic energy traveling through the slots 205 will constructively add to the acoustic energy diffracted by the tines 200. In order to provide this effect, the metal foil 195 may have to be made thicker in order to adjust the relative phase of the acoustic energy traveling through the slots 205.

Figure 9:
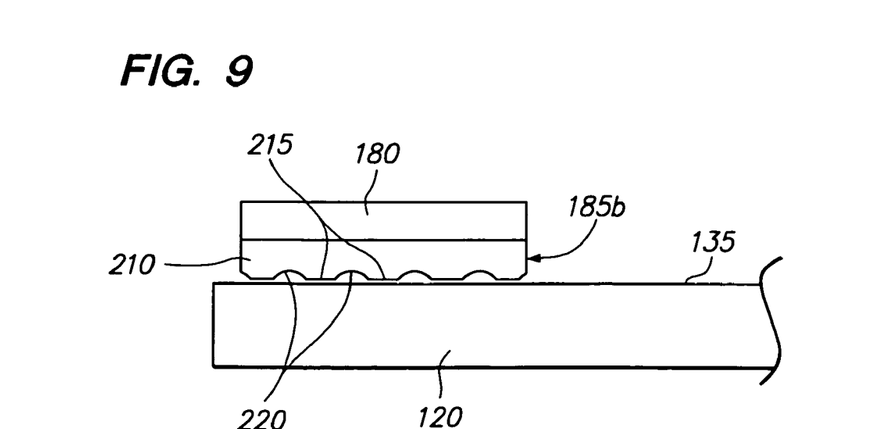
FIG. 9 is a side view of another preferred embodiment of a grating used in the touchscreen illustrated in FIG. 5.

FIG. 9 illustrates a grating 185b that comprises a metal block 210, e.g., aluminum, on which a grating pattern is hot stamped or coined to form alternating ridges 215 (perturbation elements) and grooves 220. After the coining process is completed, the metal block 210 is then adhered to the underside of the transducer 180 using a suitable adhesive, such as epoxy. The resulting subassembly (transducer 180 and metal block 210) is then suitably adhered to the front surface 135 of the substrate 120. Again, the cured cement layers should be no more than 0.025 mm thick, so that the elasticity of the grating 185 is not unduly increased. The metal block 210 is preferably one-half wavelength thick (which in aluminum, is 0.57 mm at 5.53 MHz), so that the acoustic energy is transferred between the transducer 180 and substrate 120 without changing impedances. If acoustic impedance matching is desired between unequal acoustic impedances of the transducer 180 and substrate 120, the thickness of the metal block 210 can be adjusted to achieve the desired impedance matching.

Figure 10:
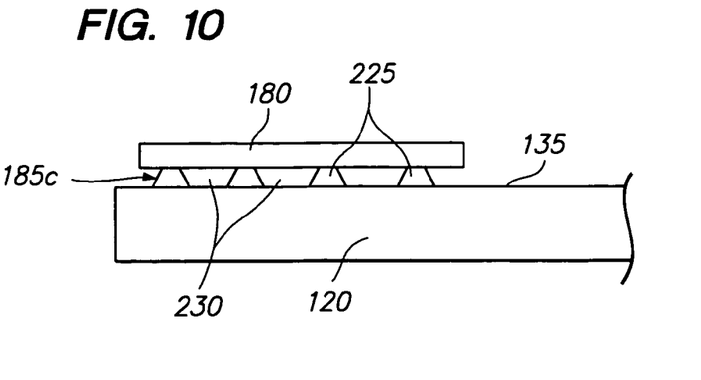
FIG. 10 is a side view of still another preferred embodiment of a grating that can be used in the touchscreen illustrated in FIG. 5.
Figure 11:
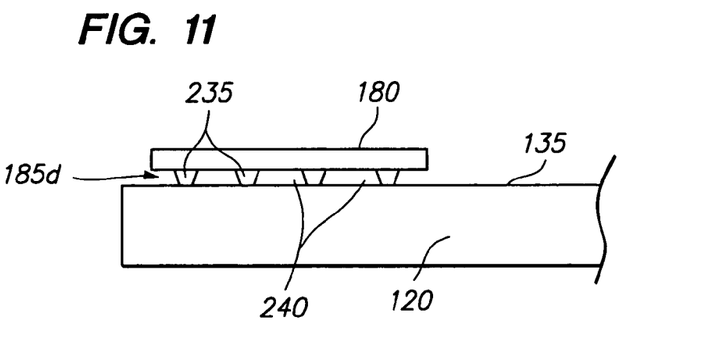
FIG. 11 is a side view of yet another preferred embodiment of a grating that can be used in the touchscreen illustrated in FIG. 5.

FIG. 10 illustrates a grating 185c that is formed by depositing a material such as glass frit (e.g., a lead-oxide containing ceramic) on the front substrate surface 135 in accordance with a grating pattern to form alternating ridges 225 and grooves 230. If needed, the substrate surface 135 may then be suitably processed to harden the grating material. The ridges 225 of the grating may then be partially ground down to ensure that all of the ridges 225 have an equal and proper height. The transducer 180 is then adhered to the flattened ridges 225 using a suitable adhesive, such as epoxy. As an alternative to ceramic material such as glass frit, the grating pattern can be printed on the front substrate surface 135 using a polymer ink. As illustrated in FIG. 11, a grating 185d can alternatively be formed by depositing glass frit or polymer ink on the bottom surface of the transducer 180 to form alternating ridges 235 and grooves 240.

Figure 12:
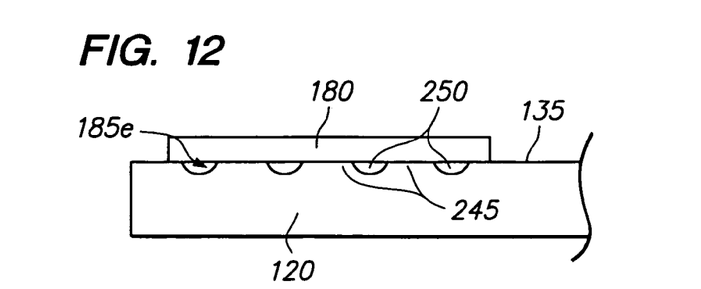
FIG. 12 is a side view of still yet another preferred embodiment of a grating that can be used in the touchscreen illustrated in FIG. 5.
Figure 13:
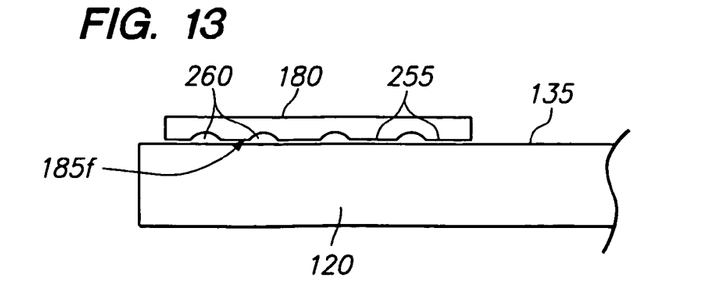
FIG. 13 is a side view of another preferred embodiment of a grating that can be used in the touchscreen illustrated in FIG. 5.

FIG. 12 illustrates a grating 185e that is formed on the front substrate surface 135 to form alternating ridges 245 and grooves 250. The grooves 250 can be formed using any suitable means, e.g., chemical etching, grinding, sandblasting, laser ablation, etc. The transducer 180 is then adhered to the grooved substrate surface 135 using a suitable adhesive, such as epoxy. In bonding the transducer 180 to the substrate, it is desirable to avoid filling the grooves with the adhesive. If such filling cannot be avoided, the grooves 250 are preferably made deep enough to render the acoustic coupling between the adhesive and the transducer 180 negligible. That is, the increased depth of the grooves 250 will accordingly increase the thickness of, and thus the compressibility, of the entranced adhesive. Optionally, the size and depth of the grooves 250 can be designed, such that the acoustic energy traveling through the adhesive is 180 degrees out-of-phase with the acoustic energy traveling through the ridges 245. As illustrated in FIG. 13, a grating 185f can alternatively be formed in the bottom surface of the transducer 180 to form alternating ridges 255 and 260.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A touch sensor, comprising:
an acoustic substrate having a surface;
an acoustic transducer comprising a piezoelectric element; and
an acoustically diffractive grating disposed between the substrate and the transducer, the diffractive grating coupling acoustic energy within the acoustic transducer to an acoustic wave propagating along the surface of the substrate.

2. The touch sensor of claim 1, wherein the diffractive grating comprises an array of parallel elements.

3. The touch sensor of claim 2 wherein the elements have a pitch equal to the wavelength of the acoustic wave.

4. The touch sensor of claim 1, wherein the diffractive grating is structurally distinct from the transducer and substrate.

5. The touch sensor of claim 1, wherein the diffractive grating is structurally integrated with the substrate.

6. The touch sensor of claim 1, wherein the diffractive grating is structurally integrated with the transducer.

7. The touch sensor of claim 1, further comprising:
another acoustic transducer; and
another acoustically diffractive grating disposed between the substrate and the other transducer, the other diffractive grating coupling acoustic energy within the other acoustic transducer to the acoustic wave.

8. The touch sensor of claim 1, wherein the substrate surface is substantially flat.

9. The touch sensor of claim 1, wherein the diffractive grating comprises a deposited glass frit.

10. The touch sensor of claim 9, wherein the glass frit is screen printed.

11. The touch sensor of claim 1, wherein the diffractive grating is formed by etching, cutting, grinding, laser ablation, molding, or hot-stamping.

12. A touch display, comprising:
a display device;
a transparent acoustic substrate having a surface, the substrate forming a front surface of the display device;
an acoustic transducer comprising a piezoelectric element; and
an acoustically diffractive grating disposed between the substrate and the transducer, the diffractive grating coupling acoustic energy within the acoustic transducer to an acoustic wave propagating along the surface of the substrate.

13. The touch display of claim 12, wherein the diffractive grating comprises an array of parallel elements.

14. The touch display of claim 12, wherein the elements are spaced from each other a distance equal to the wavelength of the acoustic wave.

15. The touch display of claim 12, wherein the diffractive grating is structurally distinct from the transducer and substrate.

16. The touch display of claim 12, wherein the diffractive grating is formed structurally integrated with the substrate.

17. The touch display of claim 12, wherein the diffractive grating is structurally Integrated with the transducer.

18. The touch display of claim 12, further comprising:
another acoustic transducer; and
another acoustically diffractive grating disposed between the substrate and the other transducer, the other diffractive grating coupling acoustic energy within the other acoustic transducer to the acoustic wave.

19. The touch display of claim 12, wherein the substrate surface is substantially flat.

20. The touch display of claim 12, wherein the diffractive grating comprises a deposited glass frit.

21. The touch sensor of claim 20, wherein the glass frit is screen printed.

22. The touch sensor of claim 12, wherein the diffractive grating is formed by etching, cutting, grinding, laser ablation, molding, or hot-stamping.

* * * * *